US008253564B2

(12) United States Patent
Lee et al.

(10) Patent No.: US 8,253,564 B2
(45) Date of Patent: Aug. 28, 2012

(54) PREDICTING A FUTURE LOCATION OF A MOVING OBJECT OBSERVED BY A SURVEILLANCE DEVICE

(75) Inventors: Kuo Chu Lee, Princeton Junction, NJ (US); Hasan Timucin Ozdemir, Plainsboro, NJ (US); Juan Yu, Cranbury, NJ (US)

(73) Assignee: Panasonic Corporation, Osaka (JP)

( * ) Notice: Subject to any disclaimer, the term of this patent is extended or adjusted under 35 U.S.C. 154(b) by 518 days.

(21) Appl. No.: 12/496,724

(22) Filed: Jul. 2, 2009

(65) Prior Publication Data
US 2010/0207762 A1      Aug. 19, 2010

Related U.S. Application Data

(60) Provisional application No. 61/153,891, filed on Feb. 19, 2009.

(51) Int. Cl.
*G08B 21/00* (2006.01)
(52) U.S. Cl. .......................... 340/541; 340/550; 382/103
(58) Field of Classification Search .................. 340/541, 340/550; 382/103; 706/15, 20, 25; 700/1
See application file for complete search history.

(56) References Cited

U.S. PATENT DOCUMENTS

| | | | |
|---|---|---|---|
| 6,947,915 | B2 | 9/2005 | Liang et al. |
| 7,088,846 | B2 | 8/2006 | Han et al. |
| 7,127,083 | B2 | 10/2006 | Han et al. |
| 2007/0260346 | A1 | 11/2007 | Ganesan et al. |
| 2008/0201116 | A1 | 8/2008 | Timucin et al. |

OTHER PUBLICATIONS

Johnson et al. "Learning the Distribution of Object Trajectories for Event Recognition", Proceedings of British Machine Vision Conference (BMVC) 1995.
Grimson et al. "Using Adaptive Tracking to Classify and Monitor Activities in a Site", Proceedings IEEE Conf. on Computer Vision and Pattern Recognition, pp. 22-31, 1998.
Stauffer et al., "Learning Patterns of Activity Using Real-Time Tracking", IEEE Transactions on Pattern Recognition and Machine Intelligence (TPAMI), 22(8):747-757, 2000.
Makris et al., "Learning Semantic Scene Models From Observing Activity in Visual Surveillance", IEEE Transactions on Systems, Man and Cybernetics. Part B, 35(3), pp. 397-408. ISSN (online) 1083-4419.
Wang et al., "Learning Semantic Scene Models by Trajectory Analysis", in Proceedings of European Conference on Computer Vision (ECCV) 2006.
Wang et al., "Trajectory Analysis and Semantic Region Modeling Using a Nonparametric Bayesian Model", in Proceedings of IEEE Computer Society Conference on Computer Vision and Patter Recognition (CVPR) 2008.
Piciarelli, C. et al, "Trajectory Clustering and its Applications for Video Surveillance", IEEE Conference on Advanced Video Signal Based Surveillance, Sep. 15, 2005.
Morris, B. T. et al, "A Survey of Vision-Based Trajectory Learning and Analysis for Surveillance", IEEE Transactions on Circuits and Systems for Video Technology, vol. 18, No. 8, Aug. 2008.

*Primary Examiner* — Jeffery Hofsass
(74) *Attorney, Agent, or Firm* — Harness, Dickey & Pierce, P.L.C.

(57) ABSTRACT

A system and method for predictive abnormal behavior detection is disclosed. The system receives surveillance data such as video data and can create and update a plurality of prediction models. The system may also receive video data relating to a moving object and may generate a prediction of the future locations of the moving object based on the generated prediction models. The predicted motion may be scored by a scoring engine to determine if the predicted motion is unsafe or otherwise undesirable.

34 Claims, 9 Drawing Sheets

PREDICTING A FUTURE LOCATION OF A MOVING OBJECT OBSERVED BY A SURVEILLANCE DEVICE

CROSS-REFERENCE TO RELATED APPLICATIONS

This application claims the benefit of U.S. Provisional Application No. 61/153,891, filed on Feb. 19, 2009. The entire disclosure of the above application is incorporated herein by reference.

FIELD

The present disclosure relates to surveillance systems and more particularly to systems and methods for abnormal behavior prediction in video surveillance systems.

BACKGROUND

Typical surveillance systems include a plurality of sensors that collects data and/or monitor for security threats based on predetermined conditions. For example, the plurality of sensors may include video cameras. Typical video surveillance systems may include a plurality of video cameras that monitor a large geographic area. For example, the large geographic area may be a warehouse. Each of the plurality of video cameras may collect metadata corresponding to a monitored area.

A typical video surveillance system typically involve a plurality of video feeds being streamed to one or more surveillance monitors. A human operator may be required to simultaneously monitor the plurality of video feeds from the plurality of video cameras, and thus, some security threats may not be detected. Therefore, video surveillance systems may include automated detection systems that monitor areas based on normal motion models already known to the automated video surveillance system. The video surveillance systems may use these normal motion models as a reference when analyzing one or more of the video feeds.

Previous automated detection systems may detect "abnormal behavior" in real-time from surveillance footage and the normal motion models. (e.g. U.S. patent application Ser. No. 11/676,127). The automatic detection system may alert the human operator of a potential security threat when abnormal behaviors are detected in the real-time surveillance video feed. The operator may analyze the potential security threat and choose whether to actuate an alarm. Additionally, the automatic detection system may actuate an alarm without notifying the operator. Furthermore, the automatic detection system may store metadata corresponding to the potential security threat for updating of the predetermined conditions and/or future analysis of the potential security threat.

For example, U.S. Pat. No. 7,088,846 discloses a video surveillance system that uses rule-based reasoning and multiple-hypothesis scoring to detect predetermined object behavior based on object movement. The system determines an alert condition based on the movement patterns of an object. The alert condition may be defined by an occurrence of a combination of particular events. For example only, the particular events may include an appearance of a person, a movement of the person towards a door, or the person swiping an object at a card reader. The system may determine whether the particular events have occurred and may determine a time stamp for each of the particular events. The system may then determine whether an alert condition has occurred based on predefined rules.

However, the system requires that an entire rule set is to be configured by the operator. Furthermore, the system requires that the particular events are to be based on a particular sequence of the particular events. Thus, these requirements may make it difficult to completely define a model of abnormal behavior for a moderate-sized to large-sized rule set.

Furthermore, there is a lack of surveillance systems that are able to predict abnormal behavior before it occurs. Such a system may prevent various security breeches and save lives, rather than report such breeches or accidents once they have occurred.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This section provides a general summary of the disclosure, and is not a comprehensive disclosure of its full scope or all of its features.

In one sense the invention is a predictive surveillance system for monitoring a space. The system comprises a metadata processing module that generates trajectory metadata corresponding to a trajectory of a monitored object including timestamps corresponding to times the monitored object were at locations of the trajectory. The system further comprises a transformation module that receives the trajectory information metadata and generates a feature vector having elements that represent motion attributes relating to preselected segments of the trajectory of the monitored object. The system includes a predictive behavior assessment module that receives said feature vector corresponding to the monitored object and that retrieves a prediction model corresponding to the predefined target area from a prediction model database. The prediction model defines an incoming trajectory for a previously monitored object and an outgoing trajectory of the previously monitored object, and an indicator corresponding to an association between the input vector and the output vector. The incoming and outgoing trajectories are represented as feature vectors and the prediction model is retrieved based on a similarity between the feature vector of the monitored object and the feature vector representing the incoming trajectory and the association between the incoming and outgoing trajectories. The system further comprises an inverse transformation module that generates a predicted trajectory based on the feature vector of the outgoing trajectory and the preselected segments of the trajectory of the previously monitored object.

In another sense the invention is a method for predicting a future location of a moving object observed by a surveillance device. The method comprises receiving motion data corresponding to the moving object from the surveillance device and generating metadata based on the received data, wherein the metadata includes a timestamp, a location and extend of the moving object. The method further comprises performing at least one wavelet transforms on a data structure based on the metadata and generating a key based on the at least one wavelet transform. The method further comprises querying a prediction model database using the key, wherein the prediction model database stores prediction models based on learned data, and wherein the prediction models each include a model key based on a first portion of a learned trajectory, a model prediction based on a second portion of the learned trajectory, and a count corresponding to a correlation between the model key and the model prediction. The method includes receiving at least one prediction model from said prediction model database based on the similarity of the key and a model key of the received prediction model. The method further comprises generating at least one future location of the moving object based on a received model key and a received count.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
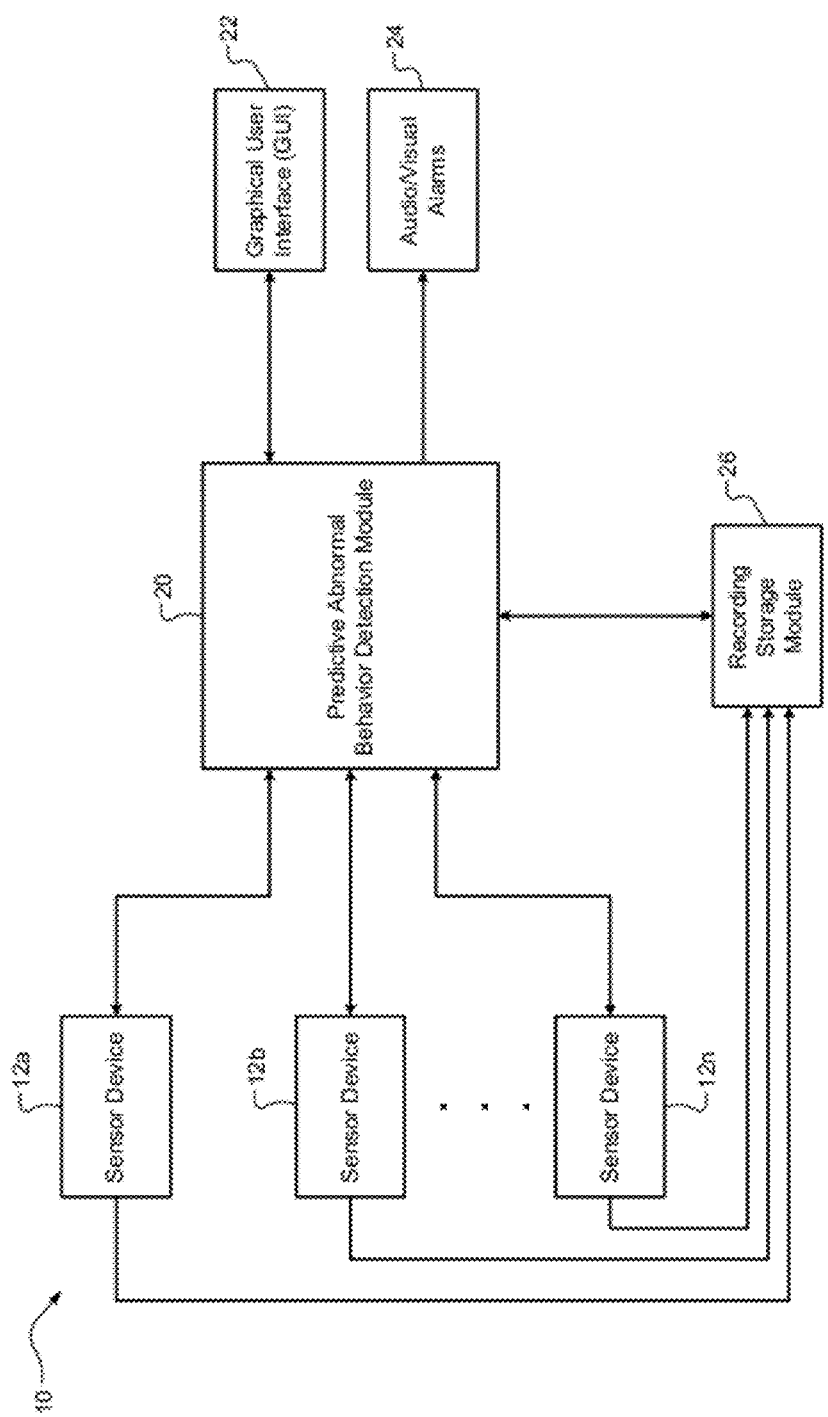
FIG. 1 is a functional block diagram of a surveillance system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

An exemplary predictive abnormal behavior detecting surveillance system is hereinafter disclosed. The exemplary predictive surveillance system implements a novel framework to predict the future locations of an object using a key vector representing real-time trajectory information for an object whose movement in the space is being monitored to query a prediction model database storing prediction models learned from data representing previously observed or stored motion models. The result of the query may return prediction models representing possible future locations of the moving object based on the key vector. The proposed system and method provide for prediction and detection of abnormal behavior of a monitored object by comparing interleaved velocity and acceleration properties corresponding to the trajectory of the monitored object with velocity and acceleration properties of a set of segments from normal, acceptable trajectories. The proposed system and method may do so efficiently, accurately, and without human intervention. The system and method are described in greater detail below.

The disclosed method aligns the reference point of a trajectory with respect to a virtual check point or target area defined by, for example, a line segment. All the trajectories that pass by or near the segments are processed by the system to obtain interleaved velocity and acceleration properties. The extracted properties go beyond the simple velocity calculations obtained by using typical noise reduction and estimation filters such as Kalman filters and other curve smoothing filters. The disclosed method uses randomly selected interleaved properties of multiple interleaved points as intrinsic features of the trajectory with respect to the virtual check point.

The set of properties extracted from the interleaved points/positions represent the segments of the trajectory before a moving object reaches the check point. The "before" and "after" trajectories may, as will become apparent from this disclosure, be thought of as input and output trajectories. The input and output trajectories, along with a set of corresponding probabilities that associate the before and after trajectories form a prediction model database, which is described in greater detail below. As will be seen, the proposed method is robust because it does not require complete trajectory information for building the "before" and "after" segments of the prediction database. Rather, the before and after segments may be derived from fragments of trajectories.

Referring to FIG. 1, an exemplary video surveillance system 10 is shown. The system may include sensing devices 12a-12n, a predictive abnormal behavior detection module 20, a graphical user interface (GUI) 22, audio/visual (A/V) alarms 24, and a recording storage module 24. The sensing devices 12a-12n may be video cameras or other devices that capture motion. Sensing devices 12a-12n record motion or image data relating to objects and communicate the image data to predictive abnormal behavior detection module 20. The predictive abnormal behavior detection module 20 may predict motion of the monitored objects based on the prediction models. The predictive abnormal behavior detection module 20 may also generate an alarm message for at least one of the GUI 22, the A/V alarm 24, and the recording storage module 24.

The sensing devices 12a-12n, may be video cameras or other devices that may capture motions, such as an infrared camera, a thermal camera, a sonar device, or a motion sensor. The sensing devices 12a-12n may be configured to record and extract motion data. The motion data may be defined with respect to a target area or a field of view of the sensing device 12a-12n. A target area and a grid are shown in FIGS. 2A-2B and described in greater detail below.

Figure 2A:
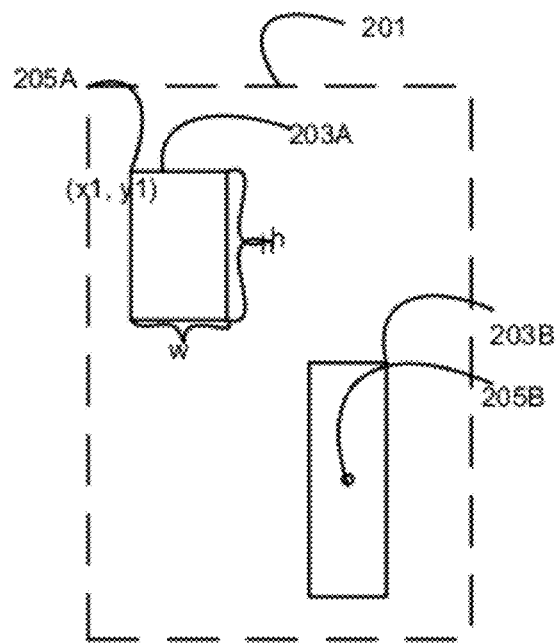
FIGS. 2A and 2B are schematics illustrating exemplary fields of view of exemplary sensing devices according to the present disclosure
Figure 2B:
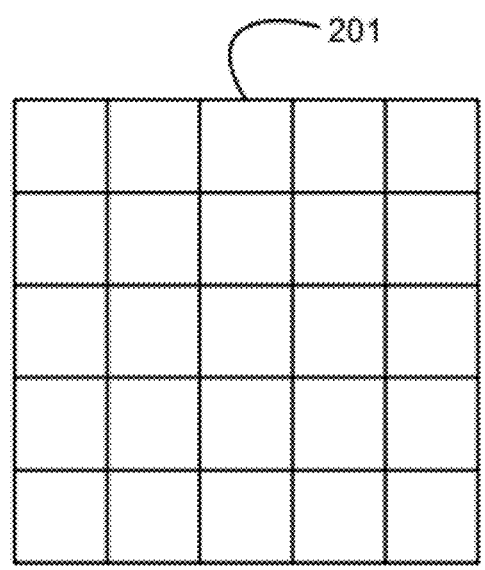

Referring now to FIG. 2A, an exemplary field of view 201 of one of the sensing devices 12a-12n is shown. The field of view 201 may include multiple target areas 203A and 203B. Target area 203A may include a upper left corner point coordinates (x1, y1) 203A, a height h, and a width w. Thus, information relating to each target area may include, the upper left corner point coordinates in image plane, the height of the target area and the width of the target area. It is appreciated that any point may be chosen to define the target area, such as the center point, lower left corner point, upper right corner point or lower right corner point. Furthermore, target area 203A may include additional information, such as a camera ID number, a field of view ID number, a target ID number and/or a name of the target area (e.g. break room door). It can be appreciated that other additional information that may be relevant to the target area may also be stored. It can be appreciated that the target area can be defined as an ellipse, a circle, a polygon, a point, a line or line segments. The target area typically represents a real monitored area of interest based on surveillance objectives. For example, entrance doors, exit doors, gate, aisles, or other areas that the security personnel have an interest for monitoring.

Target area information may be stored in a table. For example only, an exemplary table for storing target area definitions is provided:

| Camera ID # | Field of View ID # | Target Area ID # | x | y | x | h | Target Name | Key Vector and Prediction Vector Specification |
|---|---|---|---|---|---|---|---|---|
| | | | | | | | | |

The above example contains a target area description based on rectangular shape. The exemplary table contains a field for Key Vector and Prediction Vector Specification. The specification for a key vector contains the number of wavelet transforms applied to an after trajectory. The key vector specification also includes the coefficient selection criterion. As is discussed below, a key vector may be the result of multiple wavelet transforms and a coefficient selection process, whereby the coefficients are selected from a coefficients matrix where each row is obtained from one iteration of a wavelet transform. Thus, the key vector specification for selection of coefficients includes tuples of the iteration number (row indicia of the matrix) and coefficient indexes (column indicia of the matrix) for selecting coefficients to construct key vector. The specification for prediction vectors contains the coefficient selection criterion, which may be used to run an inverse wavelet transform on a predictor vector. When the different shape is desired for target area specification in field of view, the above table may contain type description which is indicative of rectangle, ellipse, circle, point, line, polygon, etc. and parameters of these geometric primitives may complete the description.

FIG. 2B illustrates another exemplary field of view 201 of one of the sensing devices 12a-12n. Field of view 201 may include a grid 207 interposed on the field of view 201 of the sensing device 12a-12n. In this case, the system automatically divides the field of view of camera into fixed size, gridded target areas. When a gridded representation is used to describe target areas, each cell may be considered a separate target area.

Figure 3:
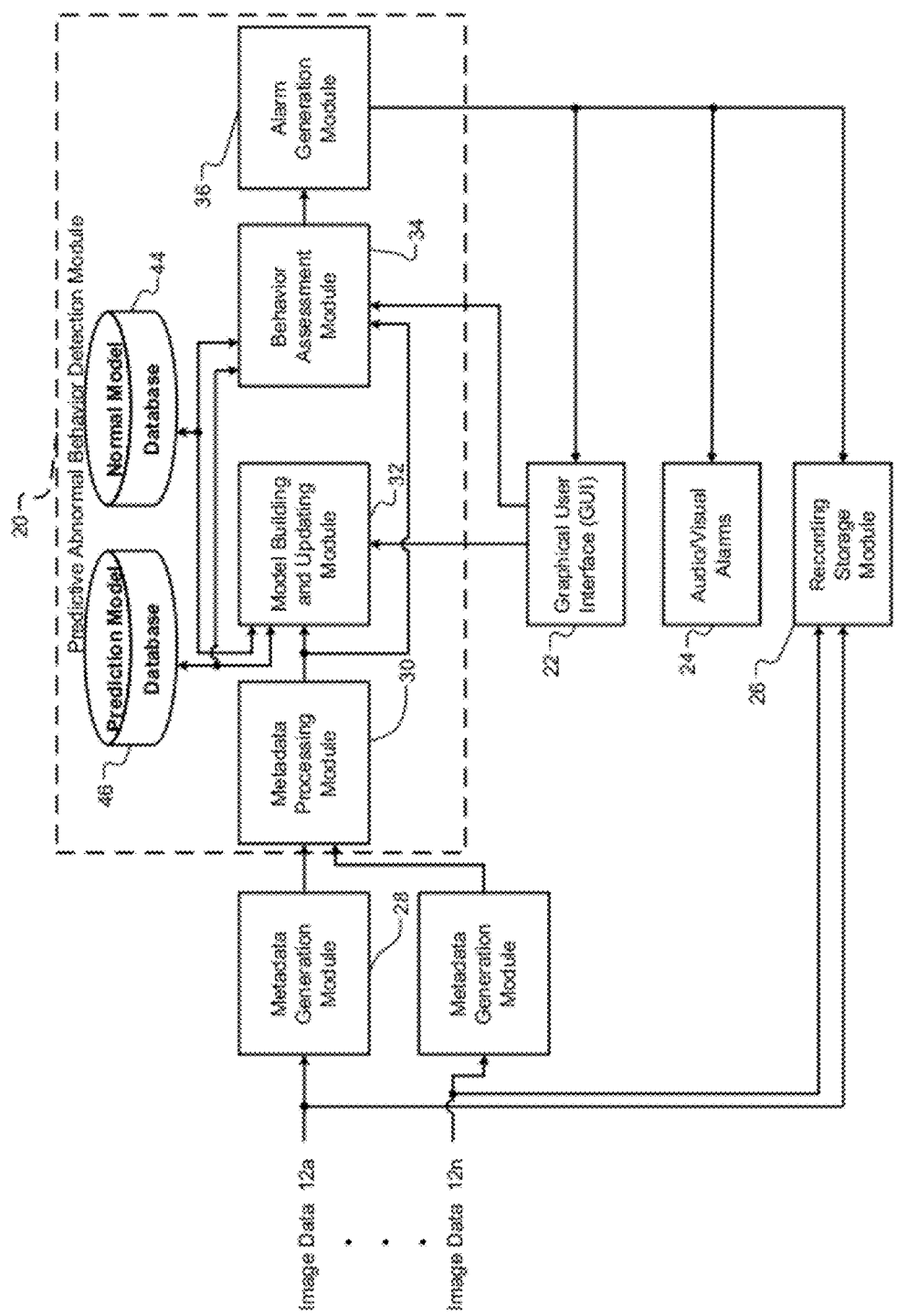
FIG. 3 is a functional block diagram of a control module according to the present disclosure.

Referring now to FIG. 3, exemplary predictive abnormal behavior detection module 20 is shown in more detail. Exemplary predictive abnormal behavior detection module 20 may include, a metadata processing module 30, a model building and updating module 32, a behavior assessment module 34, and an alarm generation module 36. Exemplary predictive abnormal behavior detection module 20 receives metadata corresponding to motion data from metadata generation module 28. It is understood that many of the modules described may be combined into a single module, or may include multiple sub modules.

Exemplary metadata generation module 30 receives the image data from sensing devices 12a-12n. Each sensing device may contain a committed metadata generation module 28 on board. Alternatively, metadata generation module 28 may reside on the actual surveillance system. It should be noted that each metadata generation module 28 requires significant processing power. Thus, if metadata generation module 28 resides on the actual surveillance system, then a single metadata generation module 28 communicating with the plurality of sensing devices 12-12n should be implemented to conserve computational resources.

Metadata generation module 28 generates metadata based on the image data from sensing devices 12a-12n. For example only, the metadata may correspond to a trajectory of an object captured by sensing devices 12a-12n. Metadata generation module 28 may use techniques known in the art to generate metadata based on received image data. Metadata can include, but is not limited to, a video camera identifier, a field of view identifier, an object identifier, a time stamp, an x-value, a y-value, an object width value, and an object height value. The metadata corresponding to a detected object may contain additional appearance properties of a detected object and merge/split event indicators for detected objects, i.e. whether two objects merged together or split apart.

The metadata processing module 30 receives the metadata from the metadata generation module 28. The metadata processing module 30 may generate additional object information based on the metadata. For example, the additional object information may include, but is not limited to, the velocity of the object, the acceleration of the object, and whether or not the observed position of object is an outlier. An outlier position may be defined as a detected position of object that violates "smooth" motion or measurements of object's attributes such as height, area, etc. This is an indication that the measurement is inaccurate and contains errors. In other words, metadata processing module 30 may recognize a nonconforming segment of the trajectory, i.e. a jump, and may then classify these object measurements as outliers and process them appropriately when derived object attributes are calculated from the raw metadata. The metadata processing module 30 may use known techniques in the art for processing video metadata.

Model building and updating module 32 receives the processed metadata from metadata processing module 30. Model building and updating module 32 may build normal motion models and prediction models and may store the models in normal model database 44 and prediction model database 46, respectively. Over the course of time, model building and updating module 32 may also update the normal motion models and prediction models based on the processed metadata.

Normal motion models may correspond to expected motion of an object or a "safe" motion of an object. Normal motion models are used as a reference or standard when analyzing the motion of object. For example, in a workplace environment a normal motion model may include a representation of an employee walking at a safe speed from a work area to a break room. Thus, if a surveillance system captures an employee walking at a safe speed from a work area to a break room, the surveillance system may compare the captured motion to one or more normal motion models to determine the employee is not breeching any security policies. Conversely, an employee walking through a restricted area or safety hazard zone towards the break room may constitute an unsafe motion or movement and thus, would probably not be included in the normal motion models. In this scenario, the video surveillance system may determine that the employee is engaging in unsafe or restricted behavior.

A normal motion model is captured in cells of data cubes and each cell may contain the statistics of object properties such as expected directional velocity, acceleration, and a minimum bounding box. A normal motion model may further include, but is not limited to, camera identifier, a field of view identifier, a target area, information on the trajectory, the velocity of the object, acceleration of the object, and object identification of the object. Normal motion models are used by the scoring module 80 of behavior assessment module 34 to score a predicted trajectory of an object. It should be appreciated that although normal motion models are typically used to analyze observed or captured motion, a normal motion model may be used to analyze a predicted motion or trajectory. Such predicted motions or trajectories may be based on prediction models.

An exemplary predictive model may be used to predict the future location of a monitored object that may be observed by the sensing devices 12a-12n. The prediction models may be stored in the prediction model database 46. Prediction models are used by behavior assessment module 34 to predict the future locations of an object based on an observed trajectory of an object and the known prediction models built from previously observed object trajectories. Each predictive model may be comprised of two vectors, a model key vector and a model predictor. As is discussed below, both the model key vector and the model predictor vectors are feature vectors having elements that represent motion attributes relating to preselected segments of a trajectory, i.e. interleaved data. Prediction model database 46 is queried by a module using a key extracted from a real-time observed trajectory of monitored object and is asked to return prediction models having model key similar to the query key. The second component, the model predictor, contains prediction vectors representing possible trajectories that the real-time observed trajectory may follow in the future.

Furthermore, prediction models may be comprised of tuples. Exemplary tuples may include a model key, a model predictor vector and a count. An exemplary model key may be represented by a key vector which represents observed incoming motion or a trajectory associated with an object with respect to a cell of a field of view or with respect to a target area. For example, a key vector may include data about the trajectory of an object relating to the locations of a object at given times, the velocities of the object at given times, and the accelerations of the object at given times, i.e. interleaved data.

The model predictor may be represented by a prediction vector which may correspond to the future locations of the trajectory with respect to the target area. For example, a prediction vector may include predictive data about the trajectory of an object relating to the locations of a object at given times, the velocities of the object at given times, and the accelerations of the object at given times. When the model keys and model predictors are expressed as key vectors and prediction vectors, respectively, the vectors may be the result of a iterative wavelet transforms, e.g. iterative Haar transforms, the details of which are described in greater detail below. A prediction model may be defined for a field of view or a grid within the field of view or with respect to one or more target areas (discussed below) in a field of view.

The count may be an indicator of a correlation or an association between a model key and a prediction key, that is—the probability that given a key vector, the object will follow the motion or trajectory defined in a particular prediction vector. The count may be represented in a number of ways, including, but not limited to, a probability or a tally of how many times a given key vector actually resulted in the model predictor vector. If the count is a tally, then the probability that a key vector results in a particular prediction vector may be represented as the tally for the particular prediction vector divided by cumulative tallies for all predictions vectors corresponding to the selected key vector. For example, given a key vector $KV_i$, there may be n possible prediction vectors $PV_1 \ldots PV_n$. Over the course of time, the sensing devices 12a-12n may observe that out of 50 times of observing motion similar to the motion corresponding to $KV_i$, the output motion or trajectory corresponded to $PV_1$ 30 times, $PV_n$ 10 times, and the remainder of the prediction vectors 10 times. Accordingly, given the key vector $KV_i$, the probability that the motion of an object corresponds to $PV_1$ is 60% and $V_n$ is 20%. It is appreciated that other methods of keeping the count may be implemented. For example, the probabilities may be dependant on the object itself, object type, or the time of day an object is observed, and/or other properties or combination of object properties. As will be described below, the count may be used to calculate an abnormality score as well.

Figure 6:
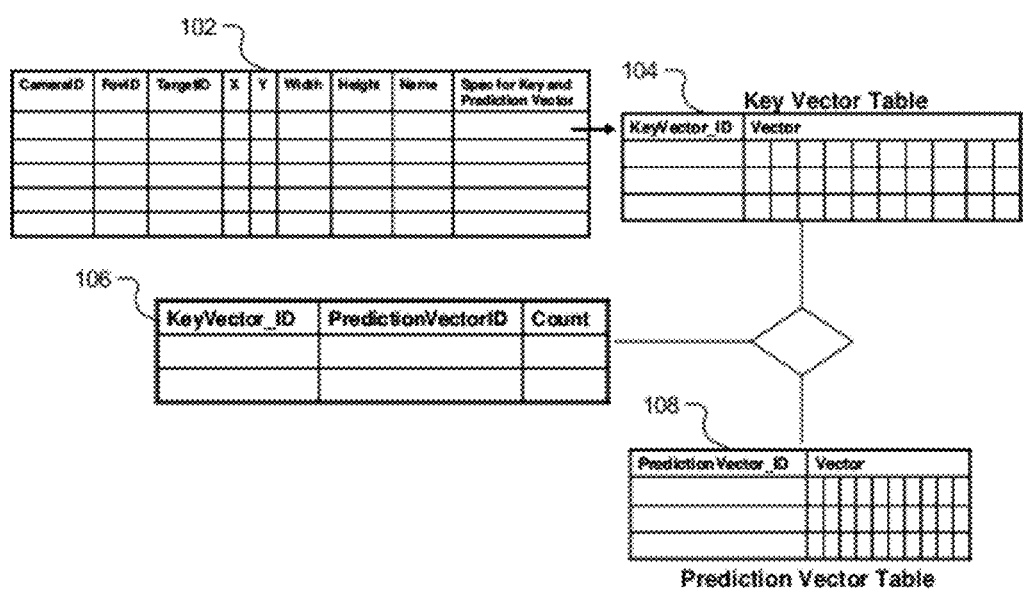
FIG. 6 is an exemplary representation of a prediction model database.
Figure 7:
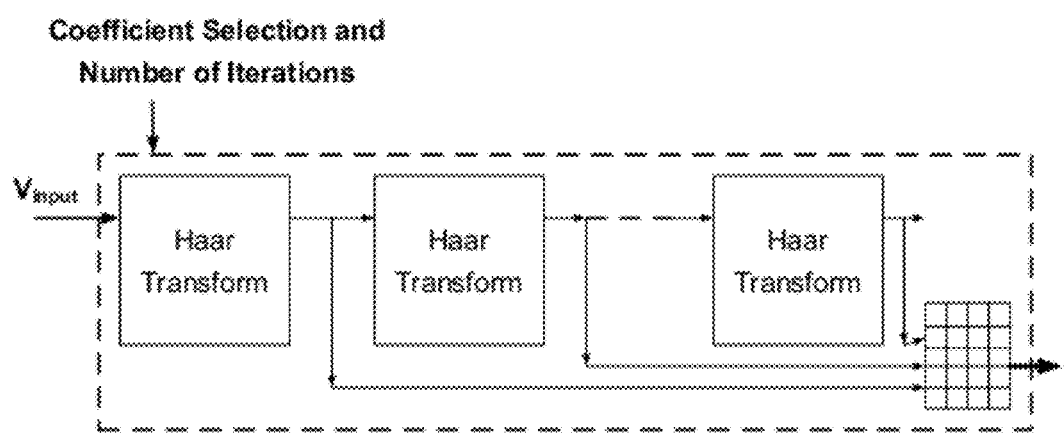
FIG. 7 is a flow diagram of a iterative Haar transform.

FIG. 6 provides an exemplary structure for storing the prediction models. In FIG. 6, a depiction of a target area table is shown. For each target area, there may be a specification for the key and prediction vectors. As discussed, this specification will provide the amount of wavelet transforms performed on an input vector and the coefficients selected from the results of the transform. The specification will also include the coefficients selected from the single wavelet transform performed on the output vector to obtain a prediction vector. For each target area there are a plurality of prediction models. The prediction models may be stored in a table of key vectors and a table of prediction vectors. Both tables may include an ID for the vector as well as the selected coefficients resulting from the wavelet transforms. Linking the two tables is a third table that lists a key vector id, a prediction vector id, and a count corresponding to the association of the key vector to the prediction vector.

Figure 4:
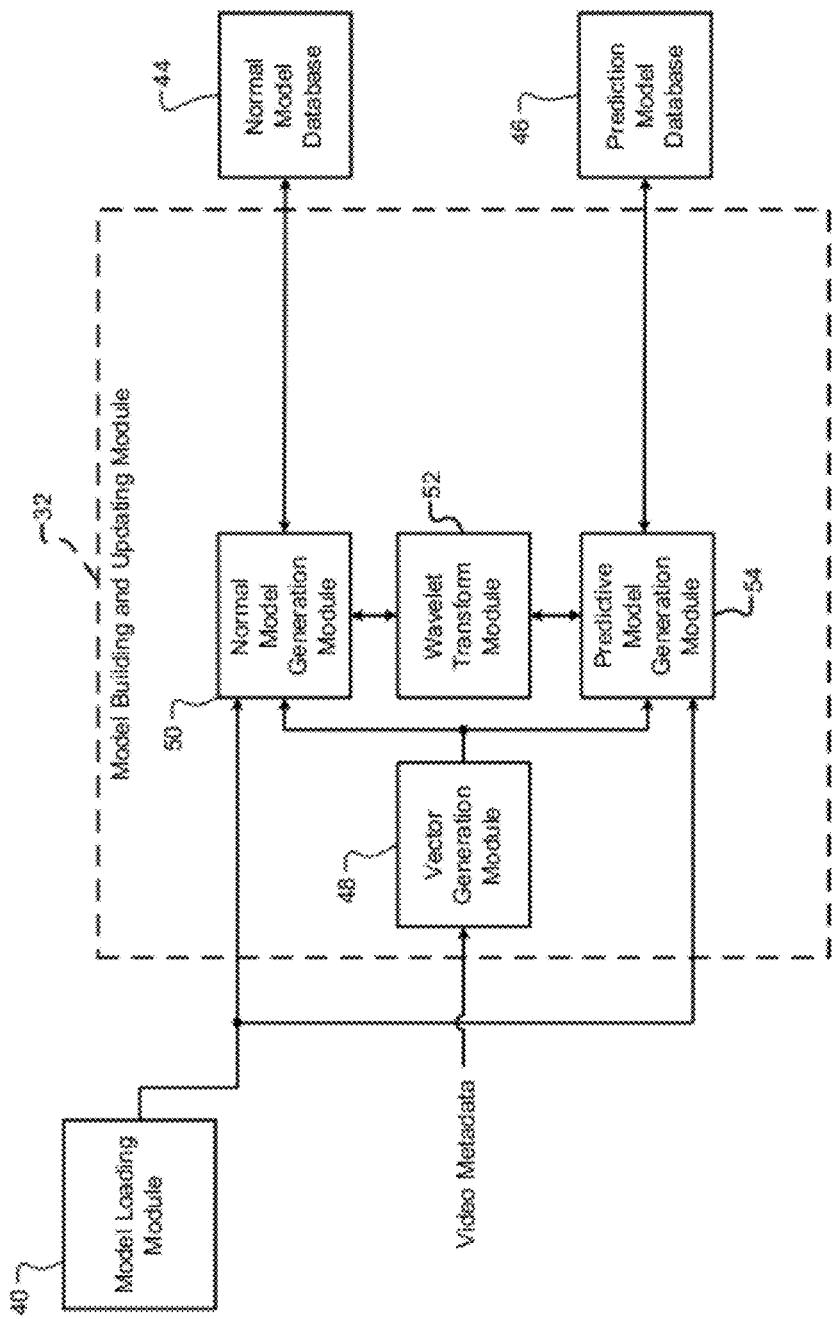
FIG. 4 is a functional block diagram of model building and updating module according to the present disclosure.

Referring now to FIG. 4, the model building and updating module 32 is shown in more detail. Model building and updating module 32 may include a prediction model generation module 54, a normal model generation module 50, a prediction model database 46, normal model database 50, and a wavelet transform module 52. Model building and updating module 32 may also include a vector generation module 48. It is understood that many of the sub-modules may actually be independent modules that communicate with other modules of the system.

The model building and updating module 32 may be operable to build prediction models and normal motion models during a training/learning phase. The model building and updating module 32 may store prediction models in prediction model database 46 and may store normal motion models in normal model database 44. Model building and updating module 32 may also update predictive model database 46 and normal motion database 44 when the system is in an operational phase.

The components of model building and updating module 32 are now described in greater detail. The vector generation module 48 receives the processed metadata from pre-processing module 32. An exemplary vector generation module may receive metadata for an object and define a vector of ordered tuples based on the metadata. For example, input vector generation module 48 may receive the metadata spanning n units of time. Vector generation module 48 will generate a vector of time-stamped location data [(ts(1), x(1), y(1)), (ts(2), x(2), y(2)), . . . , (ts(i), x(i), y(i)), . . . (ts(n), x(n), y(n))], where ts(i) is a time stamp indicating time=i, and (x(i),y(i)) indicate the position of an object with respect to a target area at ts(i). It is envisioned that the input vector may have different forms. For example, the vector may include a z-coordinate, an camera id, a field of view id, a target id, an object id, or any other relevant known information.

Alternatively, vector generation module 48 may generate a vector having data cubes as elements. Each entry in a data cube having a spatio-temporal entry may be defined with respect to a grid of the entire field of view. A data cube is an at least three dimensional data structure that may be used to describe the statistics of object properties observed in a spatio-temporal cell. Data cubes may be used to store the statistics of object properties of normal motion models as well. The generated vectors may be communicated to prediction model generation module 54 or normal motion model generation module 40.

Prediction model generation module 54 receives the generated vectors, generates prediction models, and stores prediction models in prediction model database 46. Prediction model generation module 54 may generate new prediction models to be stored in prediction model database 46 during the learning phase of the surveillance system. Prediction model generation module 54 may also use real-time data as training data and update prediction model database 46 during the operational phase of the surveillance system. The training data may include, but is not limited to, the generated vectors based on the metadata or pre-determined vectors corresponding to trajectories constructed by the developer or user of the system.

As mentioned, prediction model generation module 54 receives the motion vector and may divide the vector into two segments, an input vector and an output vector. Prediction model generation module 54 may divide the vectors into an input vector and an output vector so that the prediction model may be defined in terms of a model key vector and a model predictor vector. Thus, the input vector corresponding a trajectory traversed by the object to reach a given position may represent incoming motion; While the output vector corresponding to a predictive trajectory for the object moving from the given position may represent outgoing motion. For example only, prediction model generation module 54 may receive the vector V=[(ts(1), x(1), y(1)), (ts(2), x(2), y(2)), . . . , (ts(i), x(i), y(i)), . . . (ts(n), x(n), y(n))], and may separate the vector V into two vectors, $V_{input}$=[(ts(i), x(i), y(i)), (ts(i−1), x(i−1), y(i−1)), . . . , (ts(2), x(2), y(2)), (ts(1), x(1), y(1))] and $V_{output}$=[(ts(i+1), x(i+1), y(i+1)), . . . (ts(n), x(n), y(n))]. For each target area the trajectory passes through, the split operation is applied to obtain input and output vectors for each target area.

Predictive model generation module 54 may then communicate $V_{input}$ and $V_{output}$ to wavelet transform module 52. Wavelet transform module 52, described in greater detail below, may perform iterative wavelet transforms on $V_{input}$ and a single wavelet transform on $V_{output}$. Wavelet transform module 52 may return feature vector representations of the $V_{input}$ and $V_{output}$, which depend on interleaved information such as velocity of the object and the acceleration of the object. The results of the one or more wavelet transforms are a key vector corresponding to $V_{input}$ a prediction vector corresponding to $V_{output}$.

Furthermore, in an embodiment, prediction model generation module 54 may generate multiple input/output vectors. Referring back to the example above, input vector may only include tuples corresponding from ts(1) to ts(i−1) and the output vector would begin at ts (i). Another input vector may include tuples corresponding from ts(1) to ts(i−2). Another input vector may include tuples corresponding from ts(i) to ts(i+1) and the output vector would begin at ts(i+2). Thus for a single trajectory, prediction model generation module 54 may communicate more than one input vector to wavelet transform module 52 and may receive more than one key vector and prediction vector. It is noted that multiple trajectories may be similar to the already existing models in the prediction models database 46.

Wavelet transform module 52 receives a data structure and extracts interleaved data by running at least one wavelet transform on the data in the vector and selecting coefficients from the resulting transform. Wavelet transform module 52 returns a feature vector based on the results of the iterative wavelet transforms. For exemplary purposes, wavelet transform module 52 performs Haar transforms on the vectors. A Haar transform is a wavelet transform that extracts a feature vector based on data interleaved in the received vector. For example, based on an input vector having a plurality of time stamps and locations corresponding to the time stamps, a first Haar transform will extract first order data, i.e. the velocity of the object. The result of the first Haar transform may be transformed again using a Haar transform. The result of the second Haar transform is second order data, i.e. acceleration of an object. A third Haar transform will result in third order data representing the change of force in unit length, or the energy injection change. Thus, it should be appreciated that the proposed framework is able to distinguish trajectories taking the same path but having different speed or acceleration patterns, which allows for more accurate and robust prediction.

The Haar transform may be applied to a vector $T_i$=((t(j),x(j),y(j)), (t(j−1),x(j−1),y(j−1)), (t(j−2),x(j−2),y(j−2)) . . . ), where each tuple represents the location (x,y) in a camera field of view and a time stamp. In an alternative embodiment, the input vector may denote the distance to the target area with a corresponding time stamp, e.g. (t(i),d(i)),(t(i−1),d(i−1)). The iterative multiple Haar transform would be applied these time stamped distance measurements. In yet another alternative embodiment, the input vector may denote time-stamped angles between a direction of motion of the object and a straight line from current location of object to the target area. In this embodiment, Haar transforms may be performed on the time stamped angle measurements vector.

The extraction of a feature vector may be comprised of two steps, an iterative application of Haar wavelet transforms on the received vector, and a selection of coefficients from the output of the Haar transform function. The number of iterations and the selected coefficients are parameters of iterative Haar transformation module along with the vector itself. The selection of coefficients may be user defined, such that the user chooses which points in a trajectory are extracted and stored in the prediction model. It is noted that with respect to a specific target area, the selection of coefficients should be consistent so that similar input trajectories will have similar key vectors after the coefficient selection process. As discussed, each entry in the key vector (or a prediction vector), corresponds to a coefficient selected from the results of the Haar transforms. The coefficients are selected from a coefficients matrix in which each row is obtained from one iteration of the wavelet transform. In one embodiment the third, fifth and ninth output of each Haar transform are selected as coefficients. In a second embodiment, at least one output of each Haar transform is selected as a coefficient.

It should be noted that wavelet transform module 52 should run iterative wavelet transforms on an input vector, but should only run a single transform on an output vector. The reason is that the input vectors are used to generate key vectors, which are used to match observed trajectories with the prediction models. Conversely, the output vectors are used to generate output vectors, which are used to predict motion by means of an inverse wavelet transform. Thus, in generating a key vector it is beneficial to extract as much of the interleaved data as possible, so that each key vector has a higher degree of uniqueness. On the other hand, as an inverse wavelet transform cannot fully recapture the original motion data, it is beneficial to minimize the amount of approximation error resulting from inverse wavelet transforms which are performed to recreate the original output vector from the low order coefficients.

The number of iterations and selection of coefficients may be user or designer configurable. The result vector of the wavelet transform module 52 is communicated back to prediction model generation module 54. It is envisioned that other types of wavelet transforms may be implemented by wavelet transform module, including a wavelet packed transform, a discrete wavelet transform, or other known or unknown wavelet transforms. The output vector calculation may utilize different types of wavelet transforms including a wavelet packet transform, or discrete wavelet transform.

As mentioned, predictive model generation module 54 may communicate an input vector and/or an output vector to wavelet transform module 52 and may receive a key vector corresponding to the input vector and/or a prediction vector corresponding to the output vector. Upon receiving a key vector from wavelet transform module 54, prediction model generation module 52 may then query prediction model database 46 using a key vector. A query to prediction model database 46 entails a request to the prediction model database 46 to find all models having model key vectors similar to the key vector. It is envisioned that many types of searches may be used to query database 46. For example, in an exemplary embodiment, a K-Nearest Neighbor algorithm may be used to search prediction model database 46. The query may specify a target area or an array of data cubes along with the key vector. The query may return a set of similar model key vectors and model prediction vectors corresponding to the communicated key vector. In this instance, prediction model generation module 54 may compare the prediction vector with the set of model prediction vectors. If there is a similar model prediction vector, then the count corresponding to the key vector and similar returned prediction vector may be updated. If, however, none of the model prediction vectors are similar to the prediction vector, then a new tuple corresponding to the key vector and the prediction vector may be entered into prediction model database 46. The count of the newly entered tuple may correspond to a tally of one. Alternatively, if there are no similar model key vectors in database 46, the query may not return anything. In this instance, a new tuple corresponding to the key vector and the prediction vector may be added to prediction model database 46.

It should be understood that model building and model updating are essentially the same process and may use the same components in essentially the same way. As discussed, model building usually will occur during the learning phase, while updating will typically occur during the operational phase. During the operational phase, video data is being captured for purposes of surveying a field of view of a sensing device 12a-12n. As will be discussed below, the system captures sensor data and makes a prediction based on an incoming portion of a trajectory. The object in motion, however, will typically finish its trajectory and the sensor device 12a-12n will typically capture the remainder of the motion. Thus, the metadata associated with the entire trajectory may be captured during the operational phase and may be communicated to prediction model building and updating module 32 independent of behavior assessment module 34.

Figure 4A:
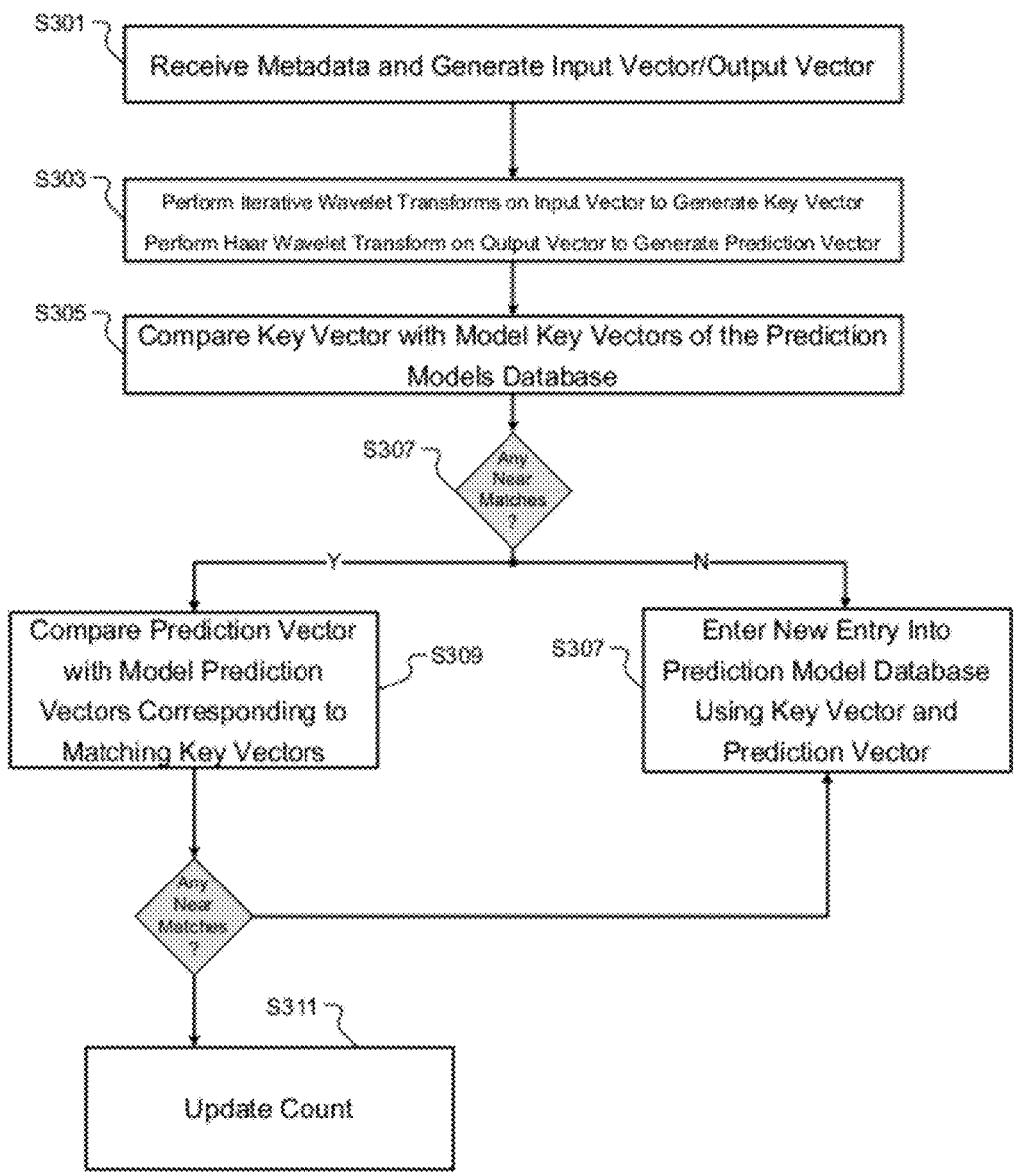
FIG. 4A is a flow diagram of an exemplary method for building prediction models according to the present disclosure.

As described above, model building and updating module 32 may operate during a training or learning phase and during an operational phase to populate prediction model database 46. FIG. 4A provides an exemplary method for the building of prediction models. It should be appreciated that the prediction model database 46 is accessed by behavior assessment module to predict the future motion of a moving object. The following is provided for example only, and it is understood that other methods may be used to populate prediction model database 46. During the training phase, at step S301 metadata corresponding to trajectories of objects may be received by building and updating module 32. Vector generation module 48 may generate motion vectors corresponding to the metadata and may communicate the motion vectors to prediction model generation module 54. Prediction model generation module 54 may divide each motion vector into an input vector and an output vector, wherein each vector is defined with respect to a target area. When the trajectory of an object passes through the target area, then the trajectory may be split into input and output vectors. An input vector may represent a trajectory as it approaches a target area, e.g. a point or line segment, and an output vector may represent a trajectory as it moves away from the target area.

At step S303, wavelet transform module 52 may receive the input vectors and iteratively perform wavelet transforms on the input vectors. The result of the iterative transforms are generally referred to as feature vectors, as the transforms extract information that was interleaved into the motion vectors. The interleaved velocity and acceleration properties may be derived by selecting coefficients such as the third, fifth, seventh, and eleventh terms of the coefficients generated by:

HAAR(input vector)
HAAR(HARR(input vector)
HAAR(HAAR((HAAR(input vector))

FIG. 8 depicts the process of performing three Haar transforms on an input vector to obtain a coefficient matrix representing the results of the multiple transforms. The sequence presented results in a high level of interleaved terms capturing the varying properties of the trajectory segments beyond the typical multi-resolution in time domain created by Haar transform or multi-spectrum property in frequency domain. As discussed, certain terms may be selected by the user from the coefficient matrix to define a feature vector. The selection of coefficients may be a parameter, along with the number of iterations to be performed. Wavelet transform module 52 may generate a feature vector referred to as a key vector corresponding to the input vector. A feature vector corresponding to a prediction vector is obtained by performing a single Haar transform on the output vector and the subsequent selection of low frequency coefficients from the results of the Haar transform. The key vector and prediction vector are communicated to prediction model generation module 54.

At step S305 prediction model generation module 54 may then query prediction model data base 46 using a key vector. Prediction model database 46 returns the prediction models having model key vectors the most similar to the key vector used for the query. As discussed, a K-Nearest Neighbor or other search algorithm may be used to determine if any near matches exist. If no near matches are found, prediction model generation module 54 stores the new key vector/prediction vector combination, along with a count in prediction model database 46 at step S307. If, however, near matches were found in prediction model database 46, then prediction model generation module 46 compares the prediction vector with the model prediction vectors corresponding to the similar key vectors at S309. At step 311 prediction model generation module 54 updates the count of the similar entry if a near match is found. Otherwise, a new entry is made using the key vector received from iterative transform module 52 and the corresponding prediction vector at step S307.

Model building and updating module 32 may also generate normal motion models based on the processed metadata via the normal model generation module 50. A normal motion model may be a model that includes normal (or safe) motion within the field of view of the camera. Thus, the normal motion models may be defined with respect to cells in the field of view of the camera or with respect to target areas in the field of view of the camera. For example only, the target area may be a door, a window, a computer, or a waypoint. Alternatively, for example only, the target area may be an arbitrary location in the field of view of the camera. In an alternative embodiment, the default set of target areas are defined by cells of a grid defining a field of view of a camera 12a-12n. Furthermore, the cells can have a temporal indicator to capture the time variance corresponding to the usage of a site usage by the moving objects.

Exemplary normal model generation module 50 may receive a motion vector from vector generation module 48 and an abnormality score from behavior assessment module 34 and may generate a normal motion model based on the motion vector and the abnormality score. Exemplary normal model generation module 50 may communicate the normal motion model to normal model database 46. During the learning phase, the behavior assessment module 34 may receive motion vectors representing the observed motion of an object and may generate an abnormality score of the observed motion. An abnormality score may indicate an extent the observed motion conformed with stored normal motion models. Thus, if a motion vector has a "normal" score, then the vector may be entered into normal model database 44. If a vector has an "abnormal" score then the vector may be precluded from being stored in normal model database 44. As will be discussed below, a "normal" score and an "abnormal" score may correspond to a threshold defined by the designer or user. Alternatively, abnormality or normality may be defined on a sliding scale. Normal motion models may be represented in various forms. As mentioned, the normal motion models may be represented in data cube format. Alternatively, the normal motion models may be represented in trajectory format defined with respect to a target area. Furthermore, the normal motion models may be represented by vectors transformed by inverse wavelet transform 52, by motion vectors, or by metadata. The format of the normal motion models may be dependent on the design choice of scoring module 80 (see FIG. 6).

Normal model database 44 stores the normal motion models. Normal model database may receive normal motion models from model building module 50 and from model updating module 52. Normal model database 44 may communicate normal motion models to behavior assessment module 34.

The model building and updating module 32 may also load new models and/or update existing models via the model loading module 40. For example only, the model loading module 40 may receive model data and/or parameters from the operator via the GUI 22. The received model data and/or parameters may be used to generate a trajectory and corresponding input/output vectors. The corresponding input/output vectors are evaluated by model building module 42 in the same manner as any other input/output vector. The resulting prediction model may be entered into the prediction model database 46.

Figure 5:
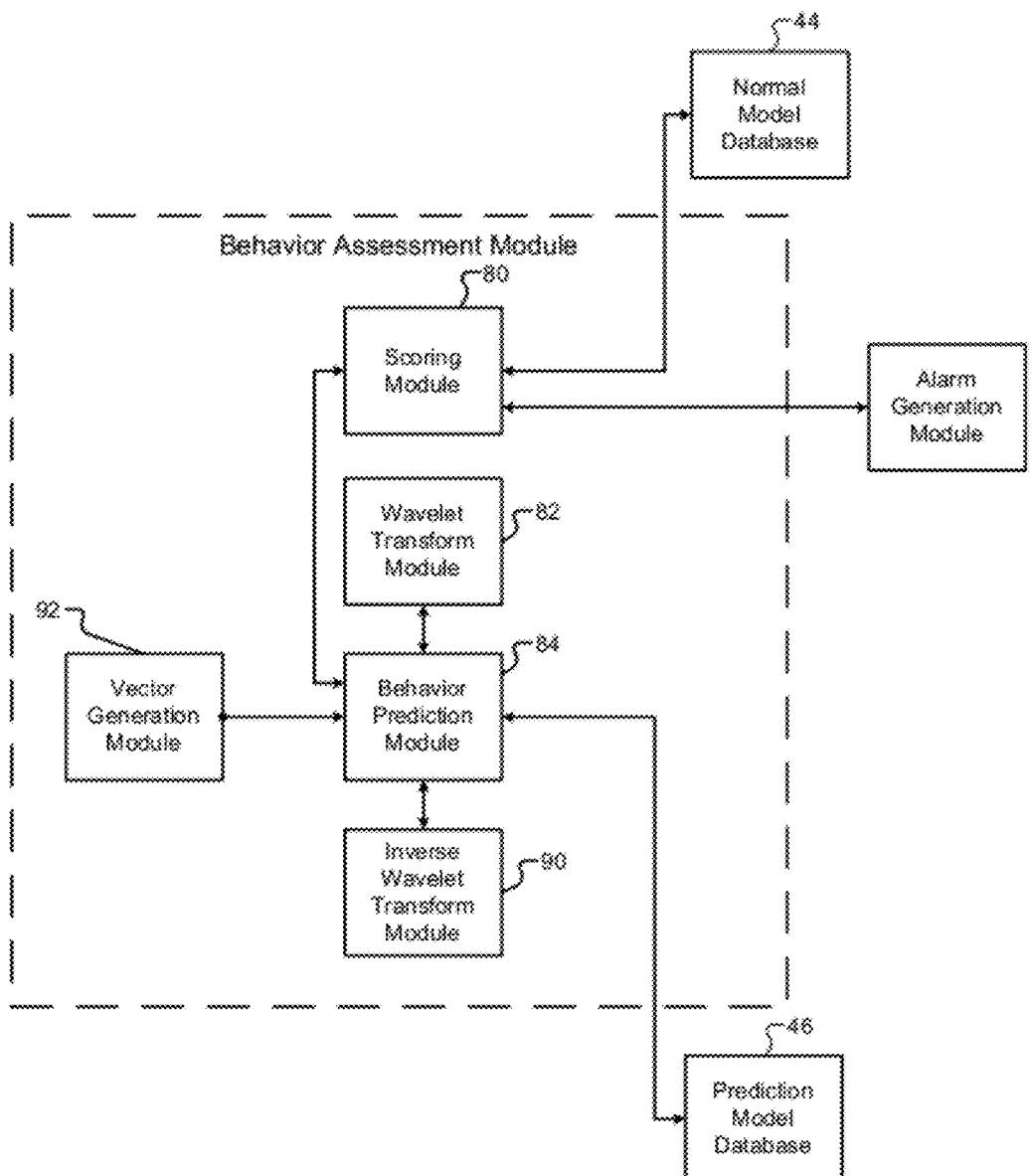
FIG. 5 is a functional block diagram of a behavior assessment module according to the present disclosure.

Referring now to FIG. 5, behavior assessment module 34 may receive metadata from the metadata processing module 30 or the metadata generation module 28 and generate at least one predicted trajectory of an object. The behavior assessment model may include, but is not limited to, a vector generation module 92 that generates a vector based on received metadata corresponding to the captured motion of an object; a behavior prediction module 84 that receives a vector and generates predicted future locations of a moving object based on the received vector; a scoring module 80 that receives the predicted future locations of the moving trajectories from the behavior prediction module 84 and that determines the predictive behavior abnormality based on the predicted future locations using the normal model database; a wavelet transform module 82 that receives the vector from behavior prediction module 84 and generates a key vector based on multiple wavelet transforms of the received vector; and an inverse wavelet transform module 90 that receives a prediction vector from behavior prediction module 84 and generates a vector representing the predicted future locations of the moving object. Behavior assessment module 34 generally communicates with prediction model database 46, normal model database 48, alarm generation module 36 and either metadata generation module 28 or metadata processing module 30.

The individual components of exemplary behavior assessment module 34 are described now in greater detail. Vector generation module 92, is similar to the vector generation module 48 in that it receives metadata corresponding to captured motion and generates a motion vector based on sensor data. It is understood that vector generation module 92 and vector generation module 48 may be the same module. Similarly, wavelet transform module 82 is similar to wavelet transform module 42, in that both wavelet transform modules receive a vector and perform a predetermined amount of wavelet transforms on the vector and selects coefficients from a coefficient matrix obtained from stacking the outputs of each wavelet transform iteration. In an alternative embodiment, the same wavelet transform module may be used by model building and updating module 32 and behavior assessment module 34.

Behavior prediction module 84 receives an input vector from vector generation module 84 and generates a prediction vector based on the input vector. The prediction vector may represent future locations of a moving object at particular times or time offsets. Both the input vector and the output vectors may be represented in data cubes and/or trajectories defined with respect to a target area. It should be understood that if the input vector is represented in trajectory mode with respect to a target area, then multiple input vectors may be defined, each vector corresponding to a target area. Behavior prediction module 84 communicates the input vector to wavelet transform module 82 and receives a key vector from wavelet transform module 82. Behavior prediction module 84 queries prediction model database 46 using the key vector as a parameter. Prediction model database 46, will return the N-closest prediction models based on a similarity between the key vector and model key vectors found in the prediction models. Prediction model database 46 may use a number of search algorithms, including a K-nearest neighbor algorithm to determine the nearest prediction models based on the key vectors of the prediction models. Parenthetically, it should be noted that rarely are two trajectories identical. Each key vector has information relating to the velocity and acceleration of the object throughout the trajectory. Thus, the likelihood of an exact match may be infinitesimal.

Once the N-closest prediction models are returned, behavior prediction module 84 may select the prediction models that are most likely to result given the key vector. As discussed, behavior prediction module may use the similarity between the key vector and the model key vectors, as well as the counts corresponding to the model key vectors to determine which of the prediction models are most likely to provide an accurate prediction. Behavior prediction module 84 may then communicate one or more of the prediction models to the inverse Haar wavelet transform module 90. Alternatively, behavior assessment module 34 may only communicate the prediction vectors of the prediction models to inverse Haar wavelet transform module 90. Inverse wavelet transform 90, returns a motion vector similar in structure to the input vector, wherein features such as velocity and acceleration are interleaved back into the data. Behavior assessment module 34 may concatenate the input vector with the returned motion vector to obtain a vector representing the predicted complete trajectory. The predicted trajectory may include a series of time stamps, and for each time stamp a corresponding position or future (predicted) position. Other data stored in the vector may also include such as a probability associated with the prediction, the target area id, the camera id, object id, and any other data pertaining to the object or the motion of the object.

Inverse wavelet transform module 90 receives a feature vector and a specification of coefficients and returns a prediction trajectory. The type of inverse wavelet transform should correspond to the type of wavelet transform used to generate the prediction vector. For example, when a Haar transform is applied on prediction vector, inverse wavelet transform module 90 should perform an inverse Haar transform. Inverse wavelet transform module 90 may obtain the coefficients selected by wavelet transform module 52 from the specification entry corresponding to prediction model, as was shown in FIG. 6. Once finished, the prediction trajectory may be represented by a motion vector a plurality of tuples representing a timestamp and a predicted (x,y) at the time designated by the time stamp. The results of inverse wavelet transform module 90 are communicated to behavior prediction module 84.

For each prediction trajectory, a vector may be generated that contains a probability that the trajectory will be followed by the moving object. The vector may also include a score value for each predicted position of the monitored object. The score may be assigned by scoring module 80, discussed below. Furthermore, it is noted that the number of predicted trajectories may be culled by the system if the probabilities do not exceed a predetermined threshold. For each prediction, behavior assessment module 34 may generate a data structure containing one or more of the following elements: a trajectory id, a probability that the trajectory will be followed, an object id, a position of the object when the prediction was determined, an abnormal behavior score, and the type of scoring engine used to determine the score.

Scoring module 80 may receive a predicted trajectory from behavior prediction module 84 and may generates a score based on the predicted trajectory and the normal motion models. The normal motion models may define safe or acceptable trajectories with respect to a cell of a grid or a target area that are acceptable trajectories. For example, the models may represent a number of trajectories for employees walking at a safe speed towards the door to a break room. Similarly, the models may define a plurality of acceptable trajectories of PITs. These models may be represented in various forms, including a data cube representation, vector notation, or any other form known in the art.

Scoring module 80 may generate an abnormality score by comparing the predicted trajectory with the normal motion models. Scoring module 80 may use any type and any number of scoring algorithms to calculate a score. An exemplary set of scoring algorithms are provided in appendix A of U.S. patent application Ser. No. 11/676,127. U.S. patent Publication Ser. No. 11/676,127 is hereinafter incorporated by reference. It is appreciated that any scoring algorithm may be implemented. Scoring module 80 may communicate a score or scores to alarm generation module 36.

Figure 5A:
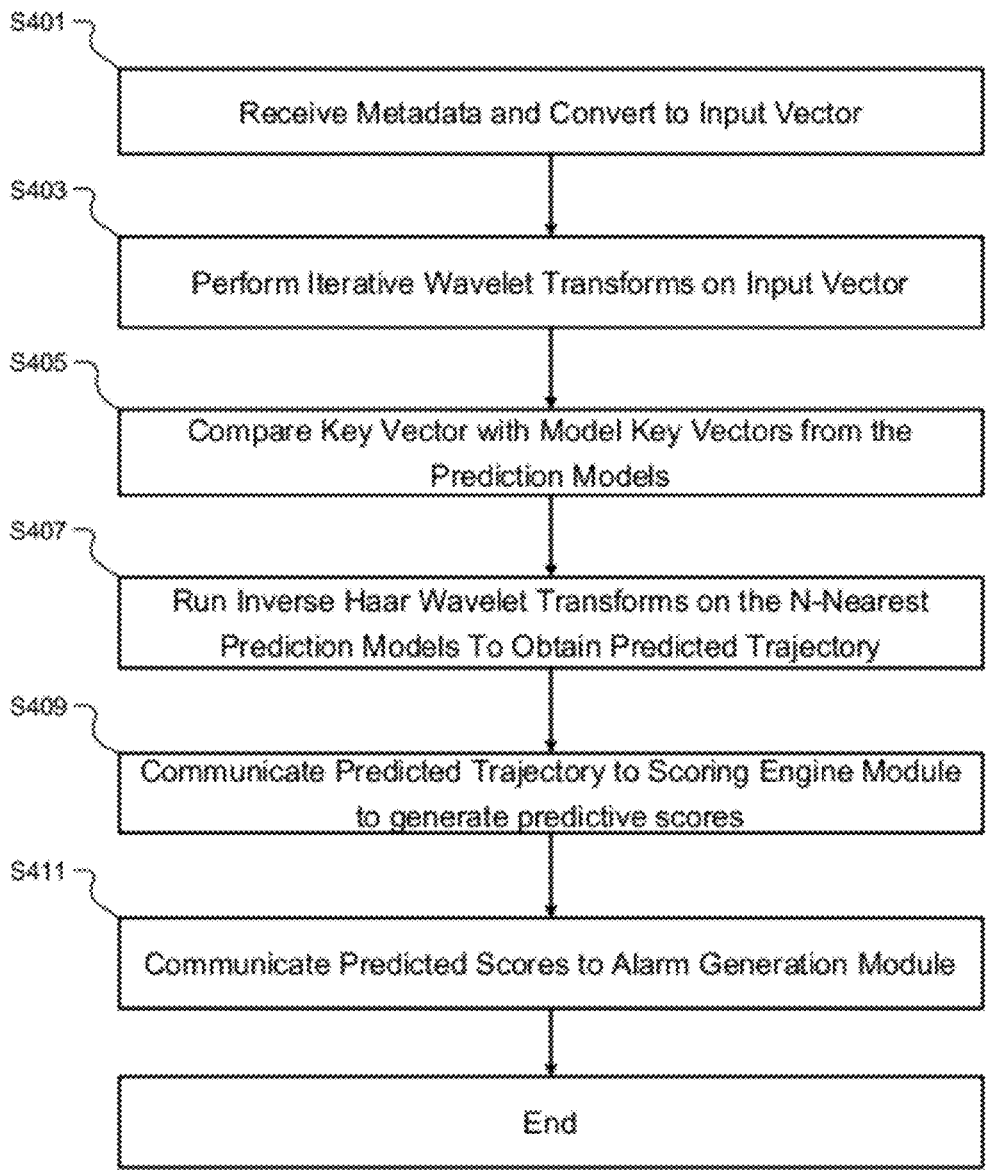
FIG. 5A is a flow diagram of a method for predicting the motion of an object.

Referring now to FIG. 5A, an exemplary method to predict the motion of an object and score the predicted motion of an object is provided. At step S401, metadata is received and converted into an input vector. The metadata corresponds to sensory data collected from sensory devices 12a-12n. Typically, in this type of scenario the system is in an operational mode, as the system may provide predicted trajectories or future locations of an object. The input vector is similar to the input vector described above, as it may represent a trajectory as it approaches a target area or an area in a space. The input vector is used by behavior assessment module 34 to predict the future locations of the moving object. It is understood that more than one input vector may be generated, as discussed above.

At step S403, iterative wavelet transforms are performed on the input vector. As discussed, the iterative wavelet transforms extract interleaved features of the motion of the object. The result of the iterative wavelet transforms may be a key vector that may be used to query prediction model database 46.

At step S405, prediction model database 46 returns the N-most similar prediction models to behavior prediction module 84 and behavior prediction module 84 compares the key vector with the model key vectors corresponding to the returned prediction models. At step S405, behavior prediction module may narrow down the prediction models based on a similarity between the key vector and the model key vectors, as well as the count corresponding to each model key vector. Based on the foregoing, behavior prediction module 84 may then select the model prediction vector or model prediction vectors with the greatest correlation to the key vector.

At step 407, inverse wavelet transform module 90 performs an inverse wavelet transform on the selected prediction vector or vectors. It may be appreciated that the inverse wavelet transform will provide an output vector that is similar in structure to the input vector described at step 401, but will represent the outgoing portion of the trajectory. The outgoing trajectory may also be thought of as the future locations of the objects, as the outgoing trajectory may include a future time stamp and a corresponding position for each time stamp. Based on the output vector, an array including timestamps and positions may be constructed. Additionally, information including the target area, the calculated score, the camera id, the object id, and additional information may be stored in the array.

At step 409, the output vector and the input vector may be communicated to the scoring module 80. Scoring module 80 may utilize one or more scoring engines. The output vector and input vector may be concatenated into a single predicted motion vector of the monitored object. The scoring engine or scoring engines will then score the predicted motion vector, by comparing the predicted motion vector with the normal motion models. A score will be assigned based on the abnormality of the predicted motion vector. The scoring engines may be any scoring engine known in the art, as prior art scoring engines scored actual observed motion, and the predicted motion vector attempts to replicate actual observed motion. U.S. patent application Ser. No. 11/676,127, discloses a number of possible scoring engine algorithms. It is envisioned, however, that any scoring engine that receives motion data and compares the motion data with motion models may be used in the present invention.

At step 411, the scores determined by scoring module 80 may be communicated to the alarm generation module 36. Alarm generation module 36 may determine if the generated score exceeds a threshold, whereby alarm generation module may send an alert notification to one or more devices or modules 22-26.

Referring now back to FIG. 2, the alarm generation module 36 may generate an alarm signal when abnormal behavior is predicted and/or detected. The alarm signal may be sent to at least one of the GUI 22, the A/V alarm 24, and the recording storage module 26. For example only, the GUI 22 may display a notification on a screen to draw attention of a security guard or other user. The guard may then watch the object to determine whether any further action should be taken. For example, the security guard may activate an alarm, such as the A/V alarm 24. However, for example only, the security guard may also classify the trajectory as normal behavior using the GUI 22, after which the corresponding data may be communicated to model building and updating module 32 so that it may be stored in the normal motion data database 44.

The A/V alarm 24 may also receive the alarm signal. While one A/V alarm 24 is shown, it can be appreciated that a plurality of A/V alarms 24 may be implemented. For example only, the A/V alarm 24 may include, but is not limited to, lights and/or sirens attached to walls, floors, vehicles, cameras, and/or wireless portable devices carried by employees. For example, the A/V alarm 24 may be activated when the alarm signal is received. However, the A/V alarm 24 may also be activated by the security guard as described above. Furthermore, different A/V alarms 24 may be activated based on the abnormality score. For example only, when the abnormality score below a threshold, a light may flash, but when the score is above the threshold, multiple lights may flash and the sirens may sound.

The recording storage module 26 may also receive the alarm signal. For example, the recording storage module 26 may begin recording image data from sensor devices 12*a*-12*n* when a high alarm signal is received. The recording storage module may allow the system 10 to capture and record all abnormal behaviors without requiring the system 10 to constantly record and/or store irrelevant data.

It can also be appreciated that the alarm signal may be sent to additional devices and/or parties. For example only, the alarm signal may be sent to a nearby police station to request assistance or to a machine to cut power in order to prevent injury to an operator.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A predictive surveillance system for monitoring a space comprising:
    a metadata processing module that generates trajectory metadata corresponding to a trajectory of a monitored object including timestamps corresponding to times the monitored object was at locations of the trajectory;
    a transformation module that receives the trajectory metadata and generates a feature vector having elements that represent motion attributes relating to preselected segments of the trajectory of the monitored object;
    a predictive behavior assessment module that receives said feature vector corresponding to the monitored object and that retrieves a prediction model corresponding to the predefined target area from a prediction model database, wherein a prediction model defines an association between an incoming trajectory for a previously monitored object and an outgoing trajectory of the previously monitored object, wherein the incoming and outgoing trajectories are represented as feature vectors, and wherein the prediction model is retrieved based on a similarity between the feature vector of the monitored object and the feature vector representing the incoming trajectory and the association between the incoming and outgoing trajectories; and
    an inverse transformation module that generates a predicted trajectory based on the feature vector of the outgoing trajectory and the preselected segments of the trajectory of the previously monitored object.

2. The system of claim 1 wherein the transformation module further comprises a wavelet transform module that receives the trajectory metadata and that generates a feature vector based on a predetermined number of wavelet transforms performed on the trajectory metadata and a selection of coefficients resulting from the wavelet transforms, wherein selection of coefficients is based on the preselected segments of the trajectory.

3. The system of claim 2 wherein the wavelet transform is a Haar transform.

4. The system of claim 1 wherein the motion attributes include velocities of the monitored object determined by using the preselected segments of the trajectory as reference points.

5. The system of claim 2 wherein the inverse transformation module further comprises an inverse wavelet transform module that receives the feature vector representing the outgoing trajectory and that generates the predicted trajectory of the monitored object by performing an inverse wavelet transform on the feature vector representing the outgoing trajectory.

6. The system of claim 1 wherein the behavior assessment module is further operable to generate an abnormality score based on a comparison of the predicted trajectory of the monitored object and at least one normal motion model, wherein the at least one normal motion model defines expected local motion of a moving object that corresponds to expected usages of an area under surveillance.

7. The system of claim 6 further comprising:
    an alarm generation module that at least one of actuates an alarm, stores image data corresponding to the trajectory metadata, and notifies a user, based on the abnormality score of the object.

8. The system of claim 1 further comprising:
    an alarm generation module that at least one of actuates an alarm, stores image data corresponding to the trajectory metadata, and notifies a user, based on the predicted future locations of the moving object.

9. The system of claim 1 further comprising:
    a model building and updating module that generates a new prediction model corresponding to the predefined target area when the prediction model database does not contain a prediction model having a feature vector representing an incoming trajectory that is similar to the feature vector of the monitored object, wherein the model building and updating module receives additional trajectory metadata corresponding to the trajectory of the monitored object representing an outgoing trajectory of the monitored object, and wherein the transformation module generates a feature vector representing the outgoing trajectory of the monitored object.

10. The system of claim 9 wherein the model building and updating module operates during a learning stage and an operational stage, wherein the learning stage corresponds to the model building and updating module receiving training data corresponding to trajectories of the previously monitored objects and the operational stage corresponds to the model building and updating module receiving real-time data corresponding to trajectories of monitored objects.

11. The system of claim 9 wherein the new prediction model is generated by the transformation module by performing at least one wavelet transform on an incoming portion of the trajectory of the monitored object and by performing a wavelet transform on the outgoing trajectory of the monitored object, wherein the transformation module selects coefficients from results of the wavelet transforms corresponding to the preselected segments of the trajectory.

12. The system of claim 11 wherein the wavelet transform is a Haar transform.

13. The system of claim 1 further comprising:
an indicator corresponding to an association between the incoming trajectory and the outgoing trajectory which represents a probability that the outgoing trajectory will occur given the incoming trajectory with respect to the target area.

14. The system of claim 6 further comprising:
an indicator corresponding to an association between the incoming trajectory and the outgoing trajectory which represents a probability that the outgoing trajectory will occur given the incoming trajectory and the abnormality score is further based on the probability that the predicted trajectory will occur.

15. The system of claim 2 wherein the selected coefficients include a third, a fifth, and a ninth coefficient output from each iteration of the wavelet transforms.

16. The system of claim 2 wherein the selected coefficients include at least one output from each iteration of the wavelet transforms.

17. A predictive surveillance system comprising:
a model building module that receives trajectory information relating to an observed trajectory of a moving object traversing a space and generates a potential prediction model based on the trajectory information, wherein the potential prediction model includes an incoming training trajectory traversed by the moving object to reach a given position, a predictive training trajectory for the moving object from the given position, and a potential count corresponding to a correlation between the incoming training trajectory and the predictive training trajectory, wherein the incoming and predictive training trajectories are represented as feature vectors having elements that represent motion attributes relating to preselected segments of the trajectory traversed by the moving object;
a prediction model database storing at least one prediction model, wherein a prediction model includes an incoming model trajectory traversed by a previously monitored object traversing the space to reach a given position and a model prediction trajectory traversed by the previously monitored object traversing the space from the given position and a count corresponding to a correlation between the incoming model trajectory and the model prediction trajectory, wherein the incoming model trajectory and the model prediction trajectory are represented as feature vectors having elements that represent motion attributes relating to preselected segments of the trajectory traversed by the previously monitored object;
the model building module using the feature vector representing the incoming training trajectory to query the prediction model database and receiving any prediction models having feature vectors representing the incoming model trajectories similar to the feature vector representing the incoming training trajectory;
the model building module storing the potential prediction model in the prediction model database when no prediction models are received by said model building module;
the model building module storing the potential prediction model in the prediction model database when none of the feature vectors representing the model prediction trajectories corresponding to the received prediction models are similar to the feature vector representing the predictive training trajectory; and
the model building module updating the count of the received prediction model when the feature vector representing the incoming training trajectory is similar to the feature vector representing the incoming model trajectory of the received prediction model and the feature vector representing the predictive training trajectory is similar to the feature vector representing the model prediction trajectory corresponding to the received prediction model.

18. The system of claim 17 further comprising:
a behavior assessment module that communicates a feature vector representing an input trajectory corresponding to trajectory information for an object whose movement in the space is being monitored and receives at least one prediction model from the prediction model database based on a similarity between the input trajectory and an input model trajectory of the received prediction model and the correlation between the input model trajectory and the model prediction trajectory of the received prediction model; and
the behavior assessment module generating at least one predicted future location of the object based on the received prediction model.

19. The system of claim 18 further comprising:
a wavelet transform module that receives a data structure based on trajectory information, and that performs at least one wavelet transform on said data structure and that generates at least one of a feature vector representing an incoming training trajectory, a feature vector representing a predictive training trajectory, a feature vector representing an incoming model trajectory, a feature vector representing a model prediction trajectory, and a feature vector representing an input trajectory based on the at least one wavelet transform and preselected portions of the trajectory information.

20. The system of claim 19 wherein the wavelet transform is a Haar transform.

21. The system of claim 19 further comprising:
an inverse wavelet transform module that receives a feature vector representing a model prediction trajectory and that performs an inverse wavelet transform on the feature vector and that generates predicted future locations of the moving object based on the inverse wavelet transform.

22. The system of claim 21 wherein the wavelet transform is a Haar transform and the inverse wavelet transform is an inverse Haar transform.

23. The system of claim 19 wherein the data structure is a data cube storing information relating to spatio-temporal localized expected motion models of observed objects in a field of view of a camera.

24. The system of claim 19 wherein the data structure is a motion vector storing information relating to a trajectory of an object with respect to time and a target area, and wherein the target area is a user defined location in a field of view of a camera.

25. The system of claim 18 wherein the behavior assessment module is further operable to generate an abnormality score based on the predicted future location of the moving object and at least one normal motion model, wherein the at least one normal motion model defines expected normal localized motion at a space that corresponds to expected usages of an area under surveillance.

26. The system of claim 25 further comprising:
an alarm generation module that at least one of actuates an alarm, stores the sensor data, and notifies a user, based on the abnormality score of the object.

27. The system of claim 18 further comprising:
an alarm generation module that at least one of actuates an alarm, stores the sensor data, and notifies a user, based on the predicted future locations of the moving object.

28. A method for predicting a future location of a moving object observed by a surveillance device comprising:
generating trajectory metadata corresponding to a trajectory of a monitored object including timestamps corresponding to times the monitored object was at locations of the trajectory;
generating a feature vector having elements that represent motion attributes relating to preselected segments of the trajectory of the monitored object based on the trajectory metadata;
retrieving a prediction model corresponding to the predefined target area from a prediction model database, wherein a prediction model defines an association between an incoming trajectory for a previously monitored object and an outgoing trajectory of the previously monitored object, wherein the incoming and outgoing trajectories are represented as feature vectors, and wherein the prediction model is retrieved based on a similarity between the feature vector of the monitored object and the feature vector representing the incoming trajectory and the association between the incoming and outgoing trajectories;
and generating a predicted trajectory based on the feature vector of the outgoing trajectory and the preselected segments of the trajectory of the previously monitored object.

29. The method of claim 28 further comprising generating at least one future location of a moving object by performing at least one inverse wavelet transform on the received model prediction.

30. The method of claim 29 wherein the wavelet transform is a Haar transform and the inverse wavelet transform is an inverse Haar transform.

31. The method of claim 28 further comprising generating a model key and a model prediction of each prediction model are based on at least one wavelet transform of metadata corresponding to an observed trajectory.

32. The method of claim 28 further comprising generating and storing in the prediction model database a prediction model based on a moving object when a key corresponding to the moving object does not correspond to any of the prediction models previously stored in the prediction model database.

33. The method of claim 28 further comprising generating an abnormality score based on a predicted future location of a moving object and at least one normal motion model, wherein the at least one normal motion model defines expected normal localized motion at a space that corresponds to expected usages of an area under surveillance.

34. The method of claim 33 wherein the abnormality score is further based on the received count.

* * * * *